United States Patent [19]

Hanson et al.

[11] Patent Number: 5,454,229

[45] Date of Patent: Oct. 3, 1995

[54] REFRIGERATION UNIT CONTROL WITH SHUTDOWN EVALUATION AND AUTOMATIC RESTART

[75] Inventors: Jay L. Hanson, Bloomington; Doyle G. Herrig, Elko; Stanley O. Hoium; James M. Roush, both of Eagan; James E. Nixon, Woodbury, all of Minn.

[73] Assignee: Thermo King Corporation, Minneapolis, Minn.

[21] Appl. No.: 245,266

[22] Filed: May 18, 1994

[51] Int. Cl.$^6$ .................................................... F25B 49/02
[52] U.S. Cl. ............................... 62/126; 62/129; 62/158; 62/230; 62/323.1
[58] Field of Search .......................... 62/133, 125, 126, 62/127, 129, 130, 157, 158, 231, 323.1, 323.4, 230; 123/198 D

[56] References Cited

U.S. PATENT DOCUMENTS

| | | | |
|---|---|---|---|
| 3,298,192 | 1/1967 | Morgan | 62/158 |
| 3,312,081 | 4/1967 | Berger et al. | 62/158 |
| 3,904,885 | 9/1975 | Hollins | 62/323.1 X |
| 4,226,090 | 10/1980 | Horian | 62/323.1 X |
| 4,928,500 | 5/1990 | Funahashi et al. | 62/129 X |
| 4,939,909 | 7/1990 | Tsuchiyama et al. | 62/126 X |
| 5,201,186 | 4/1993 | Hanson | 62/126 |
| 5,222,368 | 6/1993 | Hanson | 62/126 |

*Primary Examiner*—Harry B. Tanner

[57] ABSTRACT

Methods and apparatus for monitoring conditions which may cause shut down of a refrigeration unit. When a condition of the refrigeration unit is detected which requires shut down, a shut down counter is incremented and the shut down is made with the provision for automatic restart of the refrigeration unit in response to predetermined parameters of the refrigeration unit. When the predetermined parameters initiate automatic re-start of the refrigeration unit, a timer is started. If the refrigeration unit operates for a predetermined period of time without shut down, the counting means is reset. A shut down before expiration of the predetermined timing period again increments the shut down counter. In one embodiment, when a predetermined condition which may cause shut down approaches a predetermined shut down value, the methods and apparatus modify the operation of the refrigeration unit one or more times in an attempt to prevent shut down. A predetermined count value on the shut down counter prevents further automatic re-starts of the refrigeration unit. In a preferred embodiment, the monitored conditions which may cause shut down are the high side pressure of the refrigeration unit, and, when a refrigerant compressor is driven by an internal combustion engine, the temperature of the engine.

36 Claims, 7 Drawing Sheets

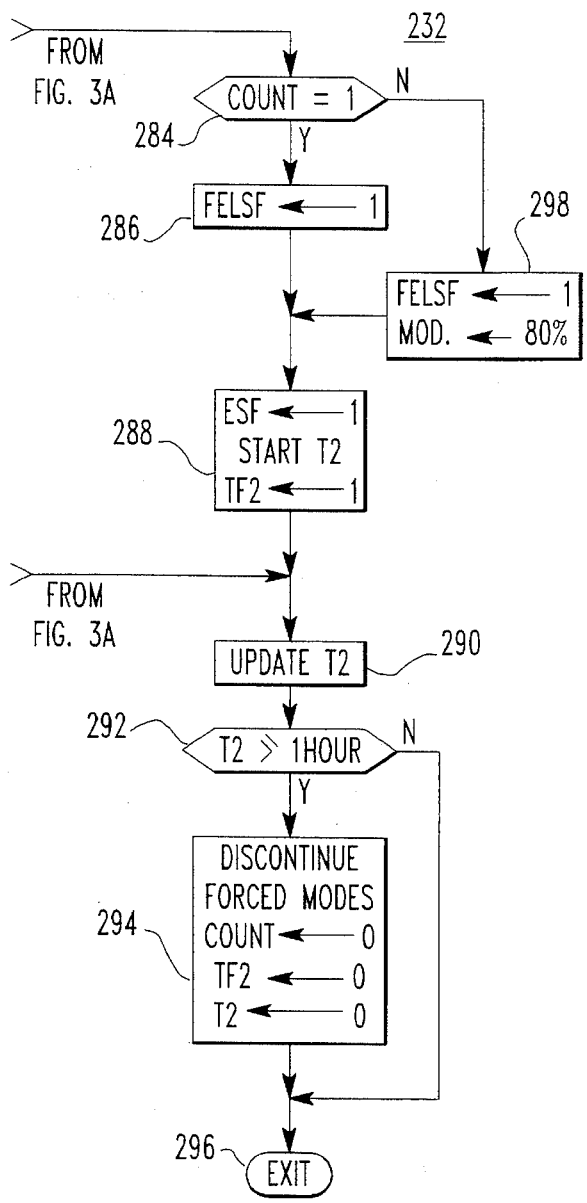
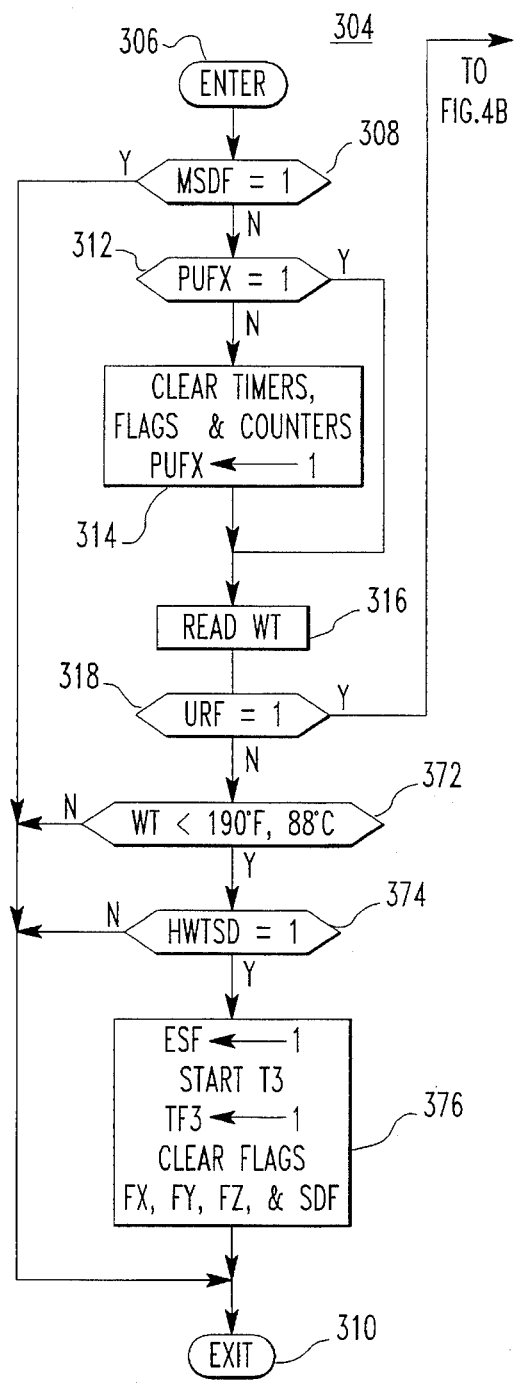
FIG.3B
FIG. 4A

RAM MAP —233

- CDTP
- CHPS
- COUNT
- COUNTX
- ESF
- FCFHSF
- FELSF
- FX
- FY
- FZ
- HHPA
- HWTA
- HWTSDF
- MOD
- MSDF
- PUF
- PUFX
- SDF
- T1
- T2
- T3
- TF1
- TF2
- TF3
- TDT
- URF
- WL
- WT

*FIG. 5*

REFRIGERATION UNIT CONTROL WITH SHUTDOWN EVALUATION AND AUTOMATIC RESTART

TECHNICAL FIELD

The invention relates in general to refrigeration units, such as transport refrigeration units, and more specifically to refrigeration units which are required to reliably operate for long periods of time without supervision.

BACKGROUND ART

U.S. Pat. Nos. 5,201,186 and 5,222,368, which are assigned to the same assignee as the present application, disclose methods for detecting conditions which may cause shut down of a refrigeration unit, such as a transport refrigeration unit. When such a condition is detected, steps are taken to modify the operation of the refrigeration unit in an attempt to find an operating condition which will prevent, or at least delay, mandatory shut down. When mandatory shut down is still found to be required, an alarm code is stored which identifies the cause of shut down, and an alarm is generated which notifies a person in charge of the refrigeration unit, such as the driver of a truck or tractor-trailer unit which the refrigeration unit is associated with.

Certain types of refrigeration units, however, are required to reliably operate for relatively long periods of time without an attendant, such as transport refrigeration units which are associated with containers carried by rail. Thus, it would be desirable, and it is an object of the present invention, to provide additional protection against permanent shut down of a refrigeration unit.

SUMMARY OF THE INVENTION

Briefly, the present invention includes methods and apparatus for operating a refrigeration unit by monitoring a predetermined parameter of the refrigeration unit, a predetermined value of which indicates a mandatory shut down condition. The refrigeration unit is shut down in the event the monitored parameter reaches the mandatory shut down condition, and a shut down count is incremented in response to the step of shutting the refrigeration unit down. The predetermined parameter is monitored during the forced shut down, and when the predetermined monitored parameter has a value which permits restarting of the refrigeration unit, the refrigeration unit is restarted if the value of the shut down count is less than a predetermined value. In the event the shut down count reaches the predetermined value, automatic restarts are prevented. When restarted, the operation of the refrigeration unit is modified, with the modification being selected to reduce the probability of the monitored parameter reaching the predetermined shut down condition. When restarted, the operation of the refrigeration unit is timed, and the shut down is reset when the refrigeration unit operates for a predetermined period of time without a mandatory shut down.

In one embodiment, the invention includes the operation of a refrigeration unit having high and low pressure sides, a refrigerant compressor connected between the high and low pressure sides, and pressure sensor means which monitors the high pressure side. The high pressure side of the refrigeration unit is monitored and the refrigeration unit is shut down in the event a first predetermined pressure is detected which indicates an over-pressure condition. Upon shut down a shut down count is incremented, and the high pressure side of the refrigeration unit is monitored during shut down. The refrigeration unit is restarted as a function of the pressure of the high pressure side and the shut down count value, restarting the refrigeration unit only after the pressure of the high pressure side has dropped below the first predetermined value to a second predetermined value, and then only when the value of the shut down count is less than a predetermined value. When restarting is initiated, the operation of the refrigeration unit is modified to reduce the load on the compressor, and the operation of the refrigeration unit is timed. If the refrigeration unit operates for a predetermined period of time without being shut down again by the step of shutting the refrigeration unit in response to an over-pressure condition, the shut down count is reset.

Another embodiment of the invention includes the operation of a refrigeration unit having a refrigerant compressor driven by an internal combustion engine monitored by a temperature sensor. In the event a first predetermined over-temperature condition is detected the operation of the refrigeration unit is modified to reduce the load on the internal combustion engine. If the modification is not successful and a predetermined maximum over-temperature condition is detected, the internal combustion engine is shut down and a shut down count is incremented. The temperature of the internal combustion is monitored during shut down, and when the temperature of the internal combustion engine has dropped to a predetermined value the internal combustion engine is restarted if the shut down count is below a predetermined value. When restarted, the operation of the internal combustion engine is timed. If the internal combustion engine operates for a predetermined period of time without being shut down again in response to the predetermined maximum over-temperature condition, the shut down count is reset.

BRIEF DESCRIPTION OF THE DRAWINGS

The invention will become more apparent by reading the following detailed description in conjunction with the drawings, which are shown by way of example only, wherein:

FIGS. 3A and 3B, when assembled, provide a detailed flow diagram of an embodiment of the invention in which high side pressure of the refrigeration unit is monitored and evaluated;

FIGS. 4A and 4B, when assembled, provide a detailed flow diagram of another embodiment of the invention in which temperature of an internal combustion engine connected to drive a refrigerant compressor is monitored and evaluated; and FIG. 5 is a ROM map listing certain timers, flags counters, and other program variables, utilized during the running of the application programs shown in FIGS. 3A, 3B, 4A and 4B.

DESCRIPTION OF PREFERRED EMBODIMENTS

Figure 1:
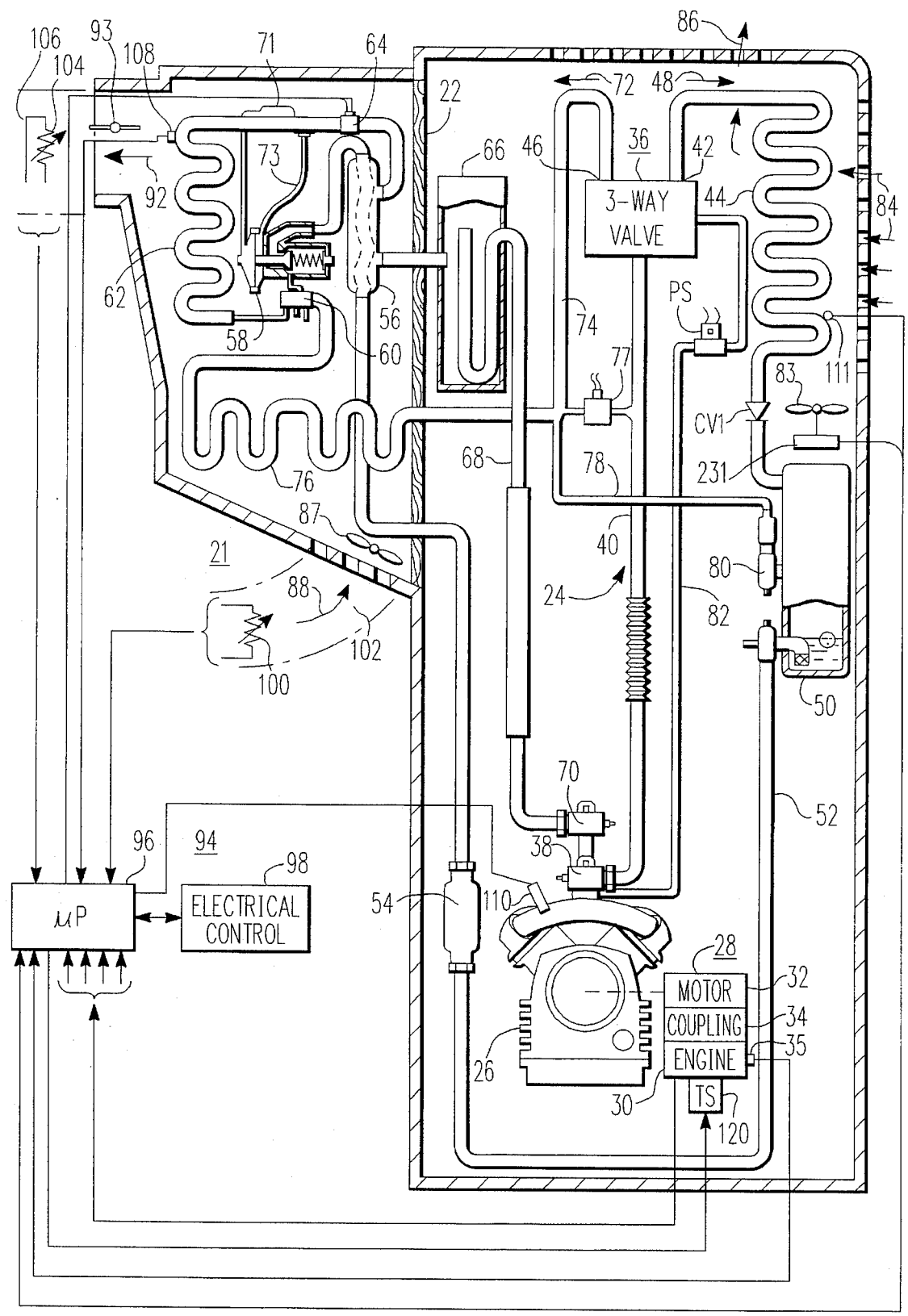
FIG. 1 is a schematic piping and wiring diagram of a refrigeration unit which may be operated according to the teachings of the invention.

Referring now to the drawing, and to FIG. 1 in particular, there is shown a transport refrigeration unit 20 which may utilize the methods of the invention. Refrigeration unit 20 controls the temperature of a conditioned space 21 to a predetermined temperature range adjacent to a selected set point temperature. Refrigeration unit 20 is especially suitable for use in transport refrigeration applications, and as such may be mounted on a container, truck, or trailer, such as on a wall 22 thereof, for example. Refrigeration unit 20 has a closed fluid refrigerant flow path 24 which includes a refrigerant compressor 26 driven by a prime mover arrangement 28. Prime mover arrangement 28 includes an internal combustion engine 30, and it may optionally include a stand-by electric motor 32. Engine 30 and motor 32, when both are utilized, are coupled to compressor 26 by a suitable clutch or coupling 34 which disengages engine 30 while motor 32 is operative. Engine 30 is selectively operable at one of at least first and second operating speeds, called high and low speed, respectively, which, for example, may be 2200 RPM and 1400 RPM. The speed selection is normally made in response to a temperature control algorithm, as described in U.S. Pat. No. 5,123,252, which is assigned to the same assignee as the present application.

Discharge ports of compressor 26 are connected to an inlet port of a three-way valve 36 via a discharge service valve 38 and a hot gas line 40. The functions of three-way valve 36, which selects heating and cooling cycles, may be provided by two separate valves, if desired. Three-way valve 36 has a first output port 42, which is selected to initiate a cooling cycle. The first output port 42 is connected to the inlet side of a condenser coil 44. Three-way valve 36 has a second outlet port 46, which is selected to initiate a heating cycle.

When three-way valve 36 selects the cooling cycle output port 42, it connects compressor 26 in a first refrigerant flow path 48, which in addition to condenser 44, includes a one-way condenser check valve CV1, a receiver 50, a liquid line 52, a refrigerant drier 54, a heat exchanger 56, an expansion valve 58, a refrigerant distributor 60, an evaporator coil 62, a controllable suction line modulation valve 64, another path through heat exchanger 56, an accumulator 66, a suction line 68, and back to a suction port of compressor 26 via a suction line service valve 70. The operative prime mover may be protected against overload by controlling modulation valve 64 to provide the function of a conventional compressor throttling valve, as taught by U.S. Pat. No. 4,977,751, which is assigned to the same assignee as the present application; or, a conventional compressor throttling valve may be disposed in suction line 68, as desired. Expansion valve 58 is controlled by a thermal bulb 71 and a pressure equalizer line 73.

When three-way valve 36 selects the heating cycle output port 46, it connects compressor 26 in a second refrigerant flow path 72. The second refrigerant flow path 72 by-passes condenser coil 44 and expansion valve 58, connecting the hot gas output of compressor 26 to the refrigerant distributor 60 via a hot gas line 74 and a defrost pan heater 76. A hot gas by-pass solenoid valve 77 may optionally be disposed between hot gas line 40 and hot gas line 74 to controllably inject hot refrigerant gas into hot gas line 74 during a cooling cycle. A by-pass or pressurizing line 78 connects hot gas line 74 to receiver 50 via by-pass and check valves 80, to force refrigerant from refrigerant receiver 50 into an active refrigerant flow path during heating and defrost cycles.

A conduit or line 82 connects three-way valve 36 to the low pressure side of compressor 26 via a normally closed pilot solenoid valve PS. When solenoid valve PS is de-energized and thus closed, three-way valve 18 is spring biased to select the cooling cycle output port 42. When evaporator 62 requires defrosting, and when the conditioned space 21 requires heat to maintain set point, pilot solenoid valve PS is energized to cause the low pressure side of compressor 26 to operate three-way valve 36 to select the heating cycle output port 46 to initiate a heating cycle or a defrost cycle.

A condenser fan or blower 83, which has selectable low and high operating speeds, causes ambient air 84 to flow through condenser coil 44, with the resulting heated air 86 being discharged to the atmosphere. An evaporator fan or blower 87 draws air 88, called "return air", from conditioned space 21, through the evaporator coil 62, and the resulting cooled or heated air 92, called "discharge air", is returned to conditioned space 21. During an evaporator defrost cycle a defrost air damper 93 may be operated to close the discharge air path to the conditioned space 90.

Transport refrigeration unit 20 is controlled by electrical control 94 which includes a microprocessor based controller 96 and electrical control circuits and components 98. Electrical control circuits and components 98 includes relays, solenoids, and the like, and will be explained relative to FIGS. 2A and 2B. Controller 96 receives input signals from a plurality of devices, including inputs from: a set point temperature selector 99 which may be manually actuated to select the desired temperature of conditioned space 21; a return air temperature sensor 100 disposed in a suitable return air path 102; a discharge air temperature sensor 104 disposed in a suitable discharge air path 106; a coil temperature sensor and switch 108 disposed to sense the temperature of the evaporator coil 62; from a refrigerant pressure sensor or high pressure cut out (HPCO) 110 disposed on the high pressure side of the refrigerant flow path 48; and from a condenser coil temperature sensor 111. The high pressure side of refrigeration unit 20 extends from the discharge side of compressor 26 to expansion valve 58, and thus, for example, pressure sensor 110 may be disposed on a discharge manifold of compressor 26, as illustrated. The low pressure side of refrigeration unit 20 extends from evaporator coil 62 to the suction side of compressor 26.

Figure 2A:
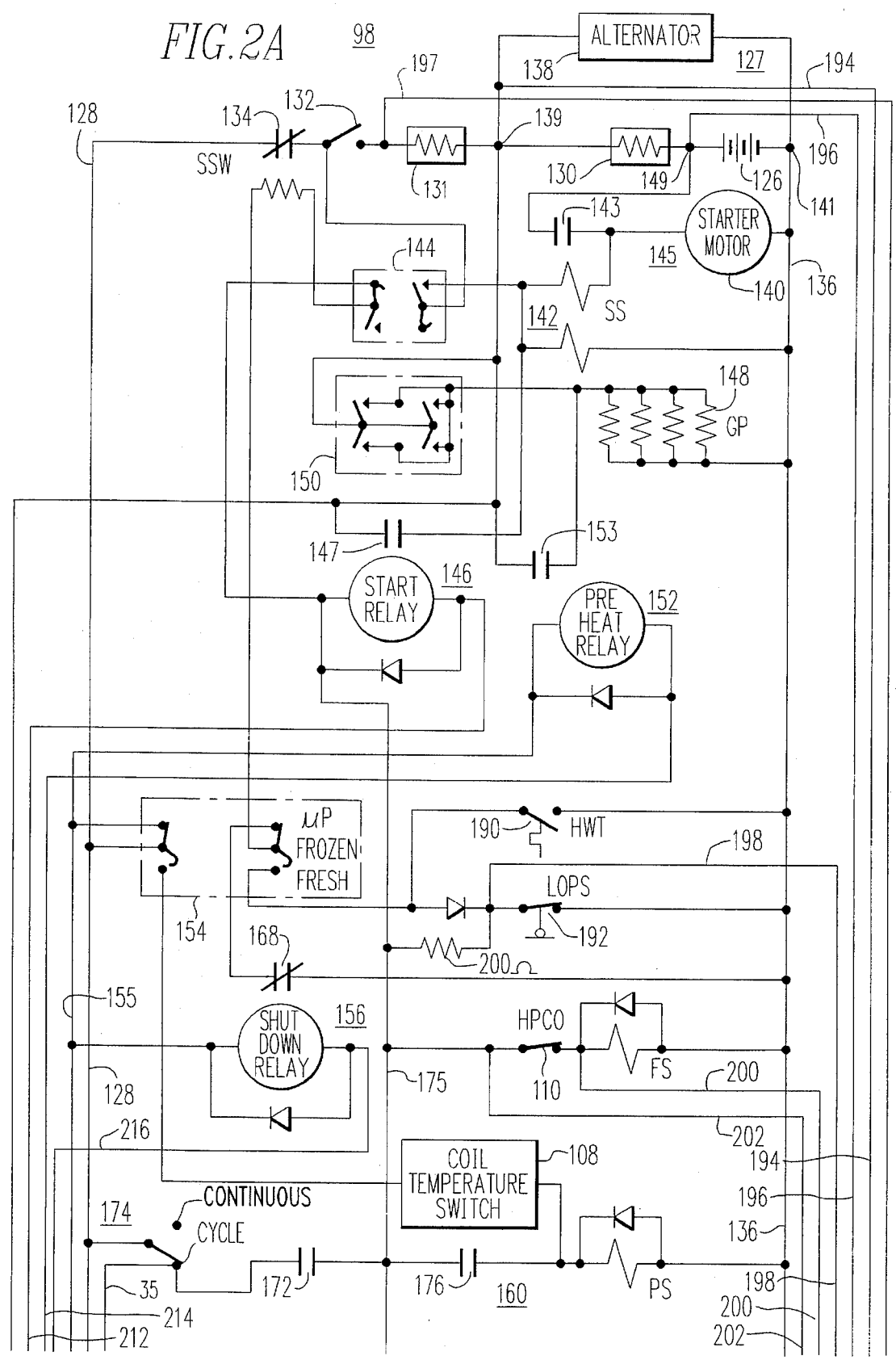
FIGS. 2A and 2B may be assembled to provide a detailed schematic diagram of electrical control shown in block form in FIG. 1.
Figure 2B:
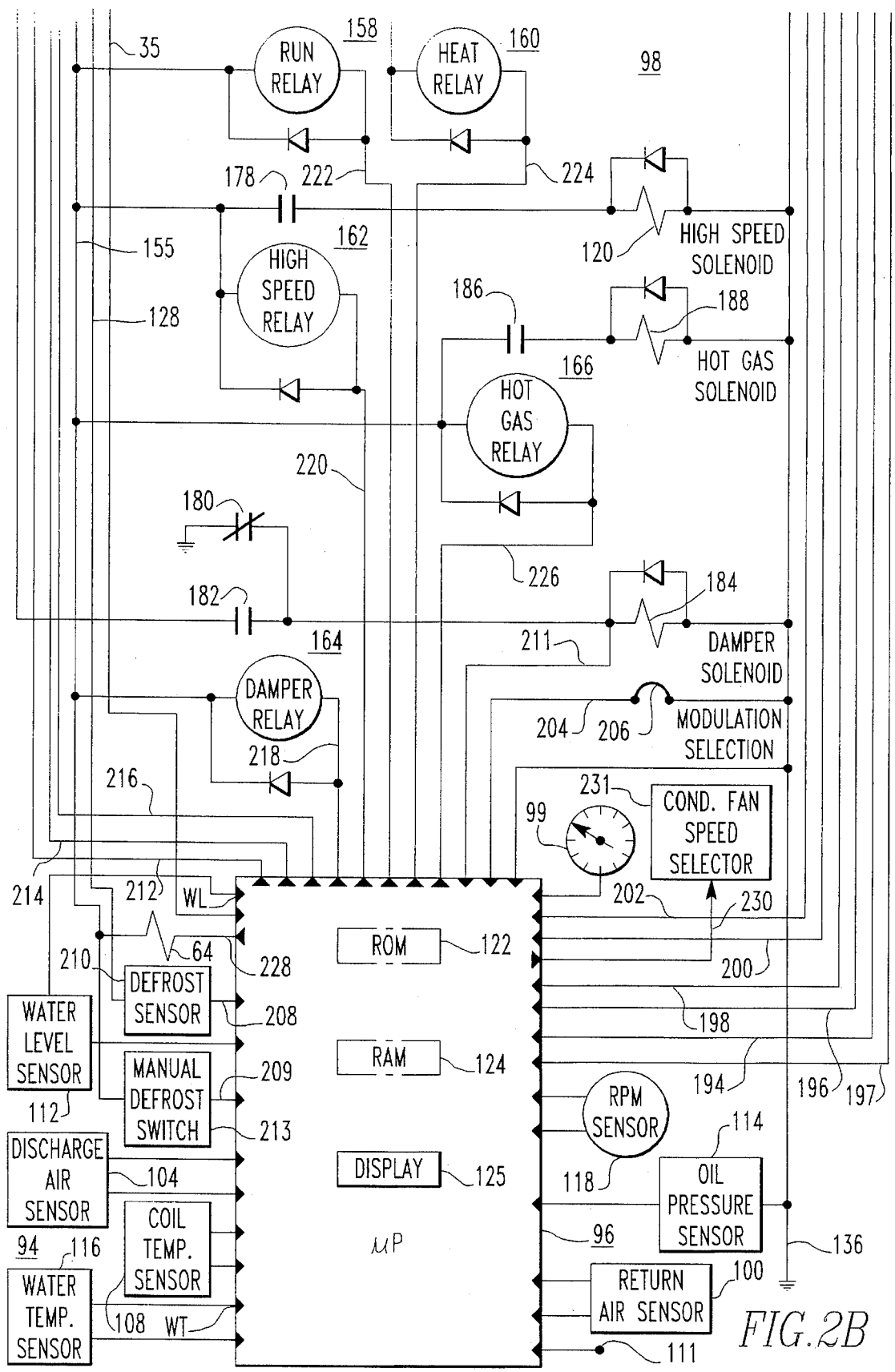

FIGS. 2A and 2B, when assembled, provide a detailed schematic diagram of electrical control 94, which includes controller 96 and electrical control 98. Electrical control receives inputs from various engine sensors, such as engine coolant level sensor 112, oil pressure sensor 114, engine coolant temperature sensor 116, and engine speed or RPM sensor 118.

Controller 96, among other things, controls modulation valve 64, hot gas valve 77, and a throttle or high speed solenoid 120 which selects the hereinbefore mentioned high and low operating speeds of engine 30.

Controller 96 includes a read-only memory (ROM) 122 for storing programs to be hereinafter described, and a random-access memory (RAM) 124 for software timers, flags, input signals, output signals, and other program variables generated by the operating programs. Controller 96 also includes a display 125 for displaying alarm or fault codes, for flashing an alarm icon or indicator, for displaying system status via status lights, and the like.

Electrical control circuits and components 98 include a source of potential or power supply 127 having first and second conductors 128 and 136, respectively. Power supply 127 includes a battery 126 which has one side connected to the first power supply conductor 128 via a first DC current measuring shunt 130, which is used to measure battery charge and discharge current, and a second DC current measuring shunt 131, which may be used to measure the current draw of the control circuit and components connected to the power supply conductors 128 and 136, as described in U.S. patent application Ser. No. 08/046,314, filed Apr. 15, 1993. Control 98 further includes an on-off switch 132, and normally closed contacts 134 of a protective reset switch SSW. The remaining side of battery 126 is connected to the second power supply conductor 136, which is grounded. Power supply 127 further includes a generator or alternator 138 driven by prime mover arrangement 28, with the generator or alternator 138 being connected from a junction point 139 between current shunts 130 and 131 to a junction point 141 on grounded conductor 136. Thus, junction points 139 and 141 form output terminals of power supply 127 which provide a voltage and current to the circuits and components connected thereto.

Control 98 also includes engine starting apparatus 145 for engine 30, with engine starting apparatus 145 having a portion which is connected directly to battery 126, e.g., to a junction 149 between the battery shunt 130 and battery 126, and a portion which is connected to power supply output terminal 139. More specifically, the portion of starting apparatus 145 which is connected to junction 149 includes a starter motor 140 which is controlled by a starter solenoid 142 having associated normally open contacts 143, an ignition switch 144, and a start relay 146 having associated normally open contacts 147. The portion of starting apparatus 145 which is connected to power supply output terminal 139, to enable current draw to be measured by the battery shunt 130, includes engine pre-heat control, including glow plug resistors (GP) 148, a pre-heat switch 150 and normally open contacts 153 of a pre-heat relay 152.

Control 98 also includes a three-position switch 154 which has two banks of three terminals each comprising a center terminal and upper and lower terminals, with reference to FIG. 2A. Switch 154, in the illustrated upper position which connects the center terminal to the upper terminal, places unit 20 under control of controller 96. The upper position provides voltage from conductor 128 to a conductor 155. An intermediate position of switch 154, in which the center terminal is not connected to either the upper terminal or the lower terminal, is selected when controller 96 is not utilized and the load in the conditioned space 21 is frozen. This switch position will cause unit 20 to operate continuously in a low speed cool mode LSC. The lower position of switch 154 is selected when controller 96 is not utilized and the load in conditioned space 21 is non-frozen. This position of switch 154 will cause unit 20 to operate continuously, switching between heating and cooling cycles under the control of the hereinbefore mentioned coil temperature sensor and switch 108. Coil temperature sensor and switch 108 is preset to close at a predetermined coil temperature, such as 35 degrees F. (1.7° C.), to energize the pilot solenoid PS and initiate a heating cycle, and to open at a predetermined higher temperature, such as 38 degrees F. (3.3° C.), to de-energize pilot solenoid PS and initiate a cooling cycle.

In addition to the control devices or relays already mentioned, control 98 includes control devices in the form of a shutdown relay 156, a run relay 158, a heat relay 160, a high speed relay 162, a defrost damper relay 164, and a hot gas relay 166. Shutdown relay 156 is normally energized, and is de-energized to shut unit 20 down via its associated set of normally-closed contacts 168 which ground the protective switch SSW and cause it to open its contacts 134. Run relay 158 has normally open contacts 172 connected to a mode selector switch 174 which has an input connected to conductor 128. Selector switch 174 selects either: (1) a continuous operating mode in which a prime mover of arrangement 28 operates continuously; or, (2) a cycling start-stop operating mode, which includes starting and stopping a prime mover of the prime mover arrangement 28.

Contacts 172 provide voltage to a conductor 175 from conductor 128 and mode selector switch 174. Run relay 158 must be energized to enable the starting and running of refrigeration unit 20 via engine 30.

Heat relay 160 has a set of normally open contacts 176 for controlling the pilot solenoid PS. High speed relay 162 has a set of normally open contacts 178 for controlling the high speed solenoid 120. Damper relay 164 has a set of normally closed contacts 180 and a set of normally open contacts 182, connected to control a defrost damper solenoid 184 which is linked to defrost damper 93. Hot gas relay 166 is provided for controlling the hot gas valve 77 via a set of normally open contacts 186 and a hot gas solenoid 188.

Control 98 also includes a engine coolant temperature switch (HWT) 190, which closes when the engine coolant reaches a predetermined elevated temperature, and a low oil pressure switch (LOPS) 192 which is open as long as engine oil pressure is normal. The closing of either switch 190 or 192 will shut unit 20 down via the manual reset switch SSW.

Controller 96 senses the voltage across the battery shunt 130 via conductors 194 and 196, and can thus determine the magnitude and polarity of battery current. One polarity, which will be called positive, indicates the battery 126 is being charged by alternator 138, which also indicates the prime mover 28 is running. The other polarity, ie., negative, indicates battery 126 is discharging.

Controller 96 senses the voltage across the control shunt 131 via conductors 197 and 194. Controller 96 can thus determine the magnitude of the current draw provided by the source of potential 127, comprised of battery 126 and alternator 138, to the various components selectively connected by controller 96 between conductors 128 and 136.

Controller 96 also has a conductor 198 which senses the position of the low oil pressure switch 192, conductors 200 and 202 which sense the voltage level on first and second sides, respectively, of the high refrigerant pressure cut-out switch 110, a conductor 204 which senses whether or not a modulation valve selector jumper 206 has connected conductor 204 to system ground 136, a conductor 208 which senses whether or not a defrost sensor switch 210 has operated, signifying the need for a defrost cycle, a conductor 211 which detects voltage on the damper solenoid 184, and a conductor 209 which senses when a manually operated defrost switch 213 has been actuated to request a defrost cycle.

Controller 96 has a plurality of output conductors or drive lines for controlling the energization and de-energization of a plurality of control devices, including conductors 212, 214, 216, 218, 220, 222, 224 and 226 for respectively controlling the operation of start relay 146, pre-heat relay 152, shutdown relay 156, damper relay 164, high speed relay 162, run relay 158, heat relay 160, and hot gas relay 166. A conductor 228 is also provided for controlling the current level in modulation valve 64, and a conductor 230 is provided for operating a condenser fan speed selector 231 which selects a predetermined high operating speed, or a predetermined low operating speed, for condenser fan 83.

As the various functions performed by controller 96 are described, only those necessary for understanding the invention will be described in detail. Reference may be had to U.S. Pat. Nos. 5,123,252; 5,123,253; 5,140,825; and 5,140, 826, which are assigned to the same assignee as the present application, for details relative to function shown in block form.

Figure 3A:
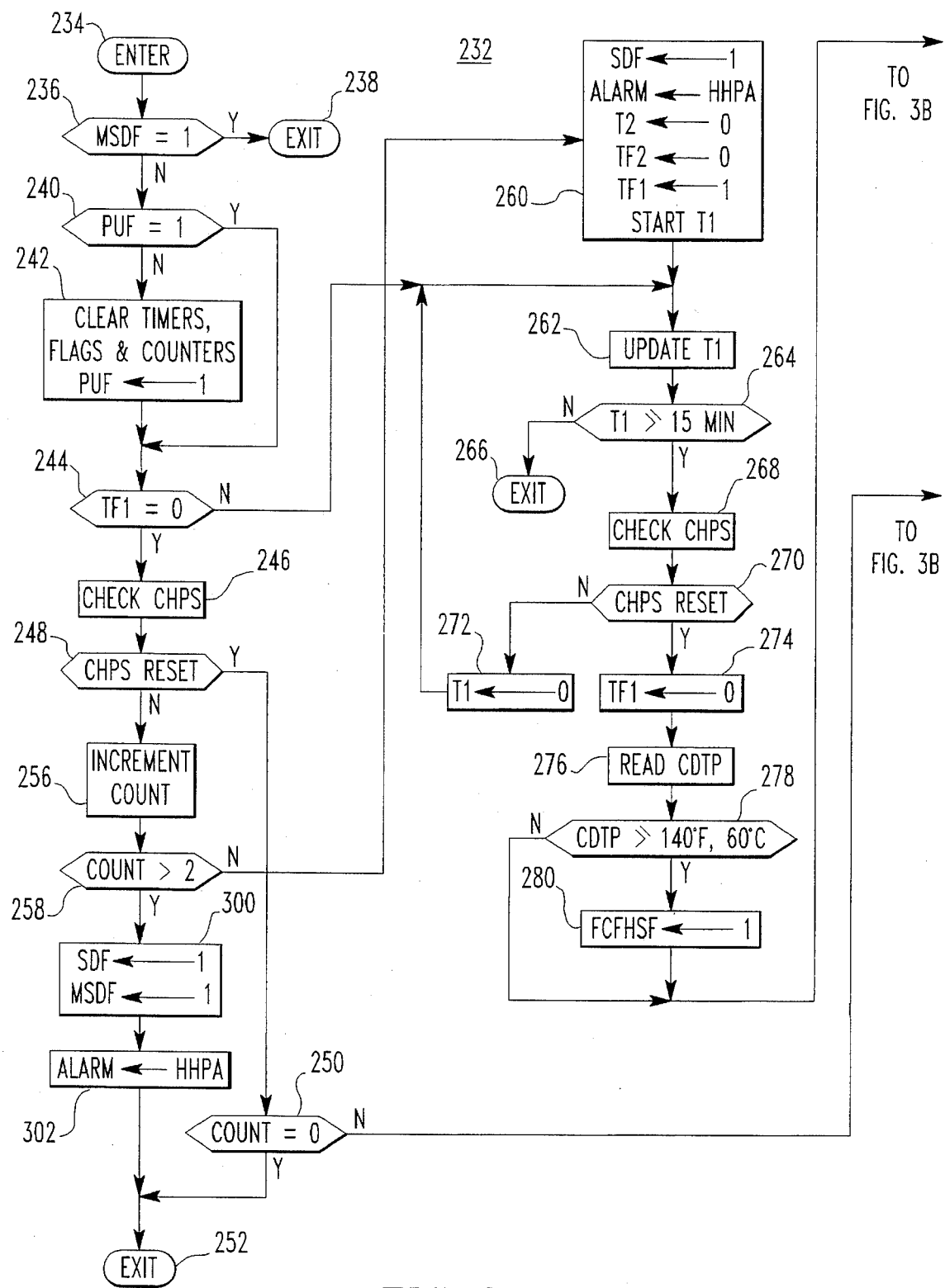

FIGS. 3A and 3B set forth a flow diagram of an application program 232 which monitors refrigerant pressure on the high pressure side of refrigeration unit 20, such as via the high pressure cut out switch (HPCO) 110 shown in FIGS. 1 and 2A. Conductors 200 and 202 monitor the position of HPCO 110. FIG. 5 is a ROM map 233 which lists timers, flags, counters, and program variables used in program 232 and stored in RAM 124 shown in FIG. 2B.

Program 232 is entered periodically at 234, whether refrigeration unit 20 is running or shut down. Step 236 checks a mandatory shut down flag MSDF. Program 232 attempts to keep refrigeration unit 20 operating, and when shut down, it evaluates predetermined parameters and will automatically restart refrigeration unit 20 after a high pressure shut down. When program 232 finds that refrigeration unit cannot be operated after all efforts have been made to keep it safely operating, the mandatory shut down flag MSDF is set, and refrigeration unit 20 will not thereafter be automatically restarted, requiring a manual reset of the unit. In the event flag MSDF is found to be set, ie., a logic one, program 232 simply exits at 238.

At this point of the description, step 236 will find that mandatory shutdown flag MSDF will be reset, ie., a logic zero, and step 236 advances to step 240 which checks a power-up flag PUF. When control 94 of refrigeration unit 20 is initially powered up during a pre-trip evaluation, flag PUF will be reset, and step 242 performs certain initialization procedures, such as clearing certain timers, flags and counters associated with program 232, and the power-up flag PUF is set. Thus, on subsequent runs through program 232, step 240 will find flag PUF set and skip step 242, advancing directly to step 244, as does step 242 during the initial running of program 232.

Step 244 checks a timer flag TF1 to see if a timer T1 has been activated. Timer T1 is activated after refrigeration unit has been shut down due to a high pressure condition on the high pressure side of refrigeration unit 20. At this point of the description, timer T1 will be deactivated, and step 246 checks a flag CHPS. Flag CHPS will be set to a logic one by controller 96 when conductors 200 and 202 indicate HPCO 110 is open, indicating an overpressure condition on the high pressure side of refrigeration unit 20, and flag CHPS will be reset to a logic zero by controller 96 when conductors 200 and 202 indicate HPCO 110 is closed, indicating the pressure on the high pressure side of refrigeration unit is below a predetermined shut down value programmed into HPCO 110.

Step 248 evaluates the finding of step 246, advancing to step 250 when CHPS is found to be reset. Step 250 checks a count value COUNT stored in RAM 124. At this point of the description, COUNT will be zero, as COUNT tabulates the number of high pressure shut downs, as will be hereinafter explained. With CHPS found to be reset in step 248, and COUNT found to be zero in step 250, refrigeration unit 20 is operating normally as far as pressure on the high side of refrigeration unit 20 is concerned, and program 232 exits at 252. Thus, with normal high side pressure, program 232 cycles through steps 234, 236, 240, 244, 246, 248, 250 and 252.

Should an over-pressure condition occur on the high pressure side of refrigeration unit 20 sufficient to open HPCO 110, unit 20 will shut down, as the fuel solenoid FS will be de-energized. Instead of merely issuing an alarm, the present invention evaluates refrigeration unit 20 after shut down and takes steps to provide automatic restart with system modification, which control feature is especially suitable for transport refrigeration units which operate for long periods of time without supervision, such as transport refrigeration units carried by rail.

When an over-pressure condition occurs step 248 will find that flag CHPS is set, and step 248 branches to step 256 which increments the software counter COUNT. Step 258 determines if the value of COUNT exceeds a predetermined count value, such as 2. The predetermined count value is selected on the basis of how many automatic restarts of refrigeration unit 20 will be allowed within a predetermined time period after a high pressure shut down. At this point of the description, COUNT will not exceed the selected count value of two, and step 258 goes to step 260.

Step 260 sets a shut down flag SDF, to indicate refrigeration unit 20 is, or should be, shut down. In the event refrigeration unit 20 should continue to run for some reason, the setting of shut down flag SDF will also initiate shut down of refrigeration unit 20, such as described in the hereinbefore mentioned U.S. Pat. No. 5,140,826. Step 260 also records an alarm code HHPA, which provides a stored record of the high pressure shut down, and an alarm indicator may be illuminated on display 125. Step 260 also deactivates a timer T2, if active, and it resets an associated timer flag TF2, if set.

As will be hereinafter explained, timer T2 is used to time operation of refrigeration unit 20 after an automatic restart following a high pressure shut down, and is thus deactivated if another high pressure shut down occurs during a timed trial period of operation during which refrigeration unit 20 is operated with certain modifications performed in an attempt to prevent another high pressure shut down. Step 260 also initiates a mandatory minimum delay period by activating a software timer T1, ie., by incrementing the count from zero, or by storing a predetermined time value therein, such as 15 minutes, depending upon whether timer T1 is to be updated by decrementing or incrementing. If will assumed that timer T1 is updated by incrementing. Timer flag TF1 is also set, to indicate that timer T1 is active. Step 262 then updates timer T1, and step 264 determines if the mandatory minimum delay period has expired. When step 264 finds the delay period has not expired, step 264 exits program 232 at 266.

When step 264 finds that the delay period has expired, step 268 checks flag CHPS and step 270 determines if HPCO 110 has closed during the delay period, indicating the pressure of the high pressure side of refrigeration unit 20 has dropped below a predetermined pressure value, which value is below the predetermined value which caused HPCO to open. If step 270 finds HPCO 110 still open, step 272 reactivates timer T1 to initiate another delay period, and step 272 returns to step 262. If step 270 finds HPCO 110 closed, step 274 resets timer flag TF1 and step 276 reads the temperature CDTP of condenser coil 44 as provided by temperature sensor 111. Sensor 111 may be an analog sensor, or a temperature operated switch which indicates when the temperature of condenser coil 44 exceeds a predetermined value, such as 140° F. (60° C.). Step 278 determines if the predetermined temperature of condenser coil 44 has been reached, or exceeded, and, if so, a flag FCFHSF is set to force operation of condenser fan 83 at the high speed setting to provide more cooling to reduce the high side pressure. Step 280 proceeds to step 284 in FIG. 3B, as does step 278 when the temperature of condenser coil 44 is below the predetermined temperature.

Step 284 in FIG. 3B determines if the value of the software counter COUNT is one. At this point of the description, COUNT will be one, and step 284 goes to step 286 which sets a flag FELSF which forces internal combustion engine 30 to run at low speed, ie., energization of high speed solenoid 120 shown in FIG. 2B is blocked. Running engine 30 at low speed will also help reduce the high side pressure of refrigeration unit 20.

Step 286 then proceeds to step 288 which sets an engine start flag ESF, it activates timer T2, and it sets timer flag TF2 to indicate that timer T2 is active. When engine start flag ESF is set, an engine start program is activated, to start engine 30 and to thus start refrigeration unit 20. A suitable engine start program is illustrated in the hereinbefore mentioned U.S. Pat. No. 5,140,826.

Timer T2 is updated in step 290 and step 292 determines if timer T2 has reached a predetermined value, such as 1 hour. If not, step 292 exits program 232 at 296. On the next running of program 232, step 244 will find timer flag TF1 reset, as flag TF1 was reset in step 274. Step 246 checks flag CHPS and, if step 248 finds flag CHPS is still reset, step 248 proceeds to step 250 which will find COUNT non-zero, indicating refrigeration unit 20 is running during the 1 hour trial period after a restart following a high pressure shut down. Step 250 then branches directly to step 290 of FIG. 3B, to update timer T2.

Should another over-pressure condition occur before timer T2 reaches 1 hour, COUNT will be incremented in step 256 and step 260 will deactivate timer T2. If timer 294 operates for the trial period of 1 hour it indicates another high pressure shut down did not occur during this trial operating period, and step 292 proceeds to step 294. Step 294 resets COUNT to zero, it deactivates timer T2, and it resets timer flag TF2. Step 294 may also discontinue the active forced operating modes. Instead of automatically discontinuing the forced operating modes, it would also be suitable to check the value of COUNT before it is reset 0. For example, if COUNT has a value of 1, then the forced operating modes would be discontinued. If COUNT has a value of 2, then all, or certain, of the forced operating modes may be continued.

If another over-pressure condition occurs while timer T2 is active, counter COUNT is incremented to two, and the mandatory minimum delay period timed by timer T1 will again be initiated, as hereinbefore described, as step 258 will proceed to step 260. When the high side pressure of refrigeration unit 20 again drops to a value where restarting of refrigeration unit is permitted, step 284 will now find that the value of software counter COUNT is 2, and step 298 initiates a second modification of refrigeration unit 20 which reduces the load on refrigerant compressor 26 still further than provided by the first modification of refrigeration unit 20 initiated by step 286. Step 298 continues the forcing of low speed operation of engine 30, by keeping flag FELSF set, and step 298 also sets the degree of suction line modulation, as selected by control of suction line modulation valve 64, to a predetermined percent modulation, such as 80%, with 0% indicating no modulation, and with 100% indicating full modulation. Engine 30 is then restarted and refrigeration unit 20 is operated during the 1 hour trial period with the second modification.

If refrigeration unit 20 operates for the full 1 hour period, then COUNT is reset to zero in step 294. If an over-pressure condition is detected during this 1 hour trial period, the software counter COUNT will be incremented to 3 in step 256 and step 258 will now find that COUNT exceeds the allowable number for allowing automatic restarts of refrigeration unit 20, and step 258 branches to step 300. Step 300 sets the unit shut down flag SDF, and it also sets the mandatory shut down flag MSDF. Thus, upon the next running of program 232, step 236 will detect that flag MSDF is set, and program 232 will immediately exit at 238, preventing any further attempts to start refrigeration unit 20. Step 300 may proceed to a step 302, to make sure alarm code HHPA is stored to indicate to service personnel the cause of the shutdown, and a visual alarm indicator on display 125 will be energized, so that it will be apparent that refrigeration unit has been shut down due to an alarm condition.

Figure 4B:
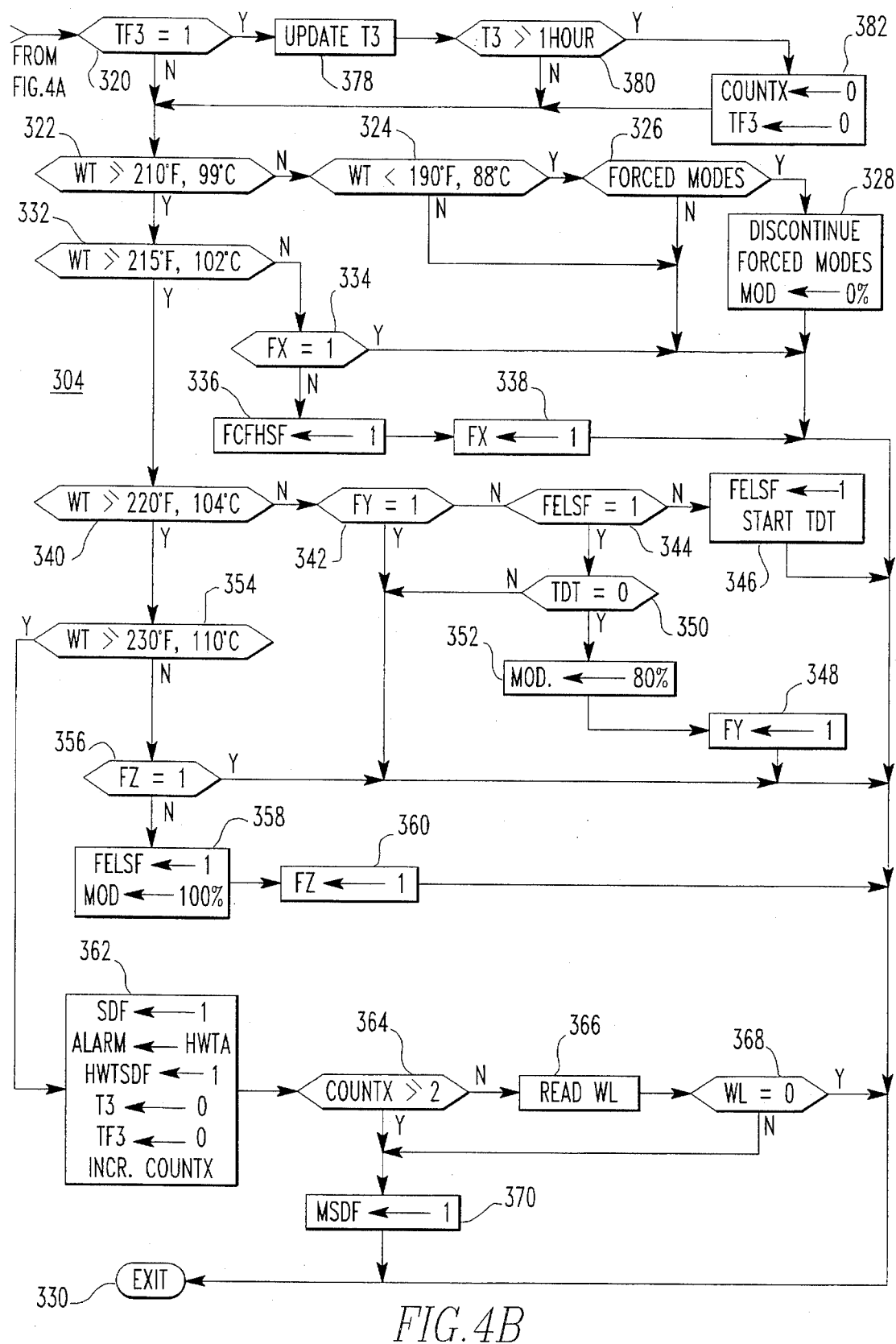

In addition to monitoring and evaluating refrigerant pressure to provide intelligent restarts after a high pressure shut down, in a preferred embodiment of the invention, the condition of engine 30 is also monitored, with evaluation of shutdown due to engine parameters, and with automatic restart in response to certain system conditions. For example, engine temperature WT may be monitored via water temperature sensor 116, and the level WL of engine coolant may be monitored via water level sensor 112, both shown in FIG. 2B. FIGS. 4A and 4B set forth a detailed flow chart of a program 304 which implements the teachings of the invention relative to the monitoring of the condition of engine 30.

Program 304 is entered periodically at 306 in FIG. 4A, whether or not refrigeration unit 20 is running or shut down, and step 308 determines if refrigeration unit 20 has already been shut down without provision for automatic restart by checking the mandatory shut down flag MSDF. If flag MSDF is set, program 304 immediately exits at 310. When flag MSDF is found to be reset, step 312 checks a power-up flag PUFX, to determine if control 94 is just being initialized at the start of trip. If flag PUFX is reset, step 314 performs the requisite initialization procedures, including clearing certain timers, flags and counters associated with program 304, and step 314 also sets flag PUFX so step 314 is skipped in subsequent runs through program 304.

Step 316 reads the temperature WT of the engine coolant, and step 318 checks an engine running flag URF to determine if engine 30 is running or shut down. If engine 30 is running, step 318 goes to step 320 in FIG. 4B. Step 320 checks a timer flag TF3 to determine if a timer T3 is active. At this point in the description, timer T3 will be deactivated, and step 322 determines if the engine coolant temperature WT exceeds a first predetermined value, such as 210° F. (99° C.). If WT is less than the first predetermined value, step 324 determines if WT is less than a second predetermined value, such as 190° F. (88° C.). If WT is less than the second predetermined value, step 380 determines if refrigeration unit 20 is operating under any modes forced by program 304. If so, step 328 discontinues the forced modes, including setting suction line modulation to 0%, if modulation had been forced by program 304. Step 328 then proceeds to program exit 330. If step 324 finds that WT is between the first and second predetermined temperature values, then step 324 proceeds directly to exit 330, as does step 326 when it finds the operation of refrigeration unit 20 has not been modified by program 304.

When step 322 finds that WT exceeds the first predetermined temperature, step 322 proceeds to step 332 which determines if WT exceeds a third predetermined temperature, such as 215° F. (102° C.). If WT does not exceed the third predetermined temperature, then WT is between the first and third predetermined temperatures 210° F. (99° C.) and 215° F. (102° C.), respectively, and program 304 branches to step 334 to initiate a first predetermined modification in the operation of refrigeration unit 20 to reduce the load on engine 30. Step 334 checks a flag FX to determine if this modification has already been implemented, and if it has not, then step 336 sets flag FCFHSF to logic 1, to force condenser coil fan 83 to operate at the higher of the two selectable speeds. Step 338 then sets flag FX, and program 304 exits at 330. On the next running of program 304, step 334 will find flag FX set, and step 334 will proceed directly to program exit 330.

When step 332 finds WT exceeds the third predetermined temperature, step 340 determines if WT exceeds a fourth predetermined temperature, such as 220° F. (104° C.). If it does not, it indicates that WT is between the third and fourth predetermined temperatures 215° F. (102° C.) and 220° F. (104° C.), respectively, and program 304 proceeds to step 342 to initiate a second predetermined modification in the operation of refrigeration unit 20. Step 342 checks a flag FY to determine if the second predetermined modification has already been implemented, and since it has not, step 344 checks flag FELSF to determine if engine 30 has already been forced to operate at the lower of the two selectable operating speeds. At this point flag FELSF will be reset, and step 346 sets flag FELSF to force low speed operation of engine 30, and step 346 also starts a time delay timer TDT, as the second predetermined modification is a two stage modification. Step 346 then exits at 330.

If the temperature of engine 30 remains between the third and fourth predetermined temperatures for the period of the time delay timer TDT, step 340 will continue to branch to step 342, step 344 will find flag FELSF set, and advance to a step 350 which determines if timer TDT has expired. If it has not, step 350 exits at 330. If WT stays in this temperature range for the time of the time delay timer TDT, it indicates that a further modification should be made in the operation of refrigerant unit 20 in an attempt to reduce the load on engine 30, and step 350 branches to step 352 at the end of the time delay period, to initiate a predetermined suction line modulation, such as 80%, for example. Step 348 proceeds to step 348 which sets flag FY, to indicate that both stages of the second predetermined modification have been resorted to, and if WT stays in this temperature range, engine 30 will operate at low speed with 80% suction line modulation.

If step 340 finds that WT exceeds the fourth predetermined temperature, step 354 determines if WT exceeds a fifth predetermined temperature, such as 230° F. (110° C.). If it does not, then WT is between the fourth and fifth predetermined temperatures 220° F. (104° C.) and 230° F. (110° C.), respectively, and step 354 advances to step 356 to initiate a third predetermined modification of refrigeration unit 20 in an attempt to reduce the temperature of engine 30. Step 356 checks a flag FZ to determine if this modification has already been implemented, and since it has not, step 358 maintains the forcing of low engine speed by keeping flag FELSF set, and suction line modulation is increased to 100%. Step 360 then sets flag FZ, and step 360 proceeds to program exit 330.

If step 354 finds that WT exceeds the fifth predetermined temperature, it indicates that the modifications have not been effective, and that engine 30 should be shut down. The fifth predetermined temperature may be selected to be slightly below the setting of high water temperature switch (HWT) 190 shown in FIG. 2A, as when HWT 190 closes, it will also shut refrigeration unit 20 down.

Step 362 sets shut down flag SDF, to initiate shut down of engine 30, an appropriate alarm code HWTA is stored for recall in display 125, a visual alarm indicator may be energized, a flag HWTSDF is set to indicate that shut down has been caused by high engine temperature, a timer T3 is deactivated, if active, and its associated flag TF3 is reset. Step 362 also increments a software counter COUNTX. Step 362 goes to step 364 which determines if the value of COUNTX has reached a predetermined value, which value determines whether or not engine 30 should be automatically restarted, or shut down until manually reset. This count value, for example, may be 2. If COUNTX has not reached 2, step 366 reads the water level WL provided by water level sensor 112 shown in FIG. 23. If WL is a logic 0, it indicates the water level is O.K., and it WL is a logic 1 it indicates that the water level is too low to allow further automatic restarts of engine 30. Step 366 proceeds to step 368 which checks the result of step 366, with step 368 proceeding to program exit 330 when WL is 0.

If COUNTX has reached 2, step 364 goes to step 370 which sets mandatory shut down flag MSDF, and step 370 exits program 304 at 330. Step 368 goes to step 370 upon finding a low coolant level, ie., WL=1. If COUNTX has not reached 2, and the water level is. O.K., step 368 exits program 304 at 330.

Engine 30 is thus shut down in response to step 362 setting shut down flag SDF, and upon the next running of program 304, step 318 will find that the engine running flag is not true, ie., a logic 0., and step 318 branches to step 372 which determines if WT is less than the second predetermined temperature 190° F. (88° C.). If WT is not less than this second predetermined temperature, engine 30 is not ready for an automatic restart following a high coolant temperature shut down, and program 304 exits at 310. When engine 30 has cooled below 190° F. (88° C.), step 372 proceeds to step 374 which checks flag HWTSD to determine if engine 30 is not running due to a high engine temperature shut down. If engine 30 was shut down for some other reason, eg., it may simply be in a null cycle when operating in a start-stop mode, program 304 exits at 310. When step 374 finds flag HWTSD is set, then it means that engine 30 was shut down due to high engine temperature, and that it is now cool enough to restart. Step 374 then proceeds to step 376 which sets the engine start flag ESF, to initiate an automatic restart of engine 30, it starts a timer T3, it sets timer flag TF3, and it clears flags FX, FY, FZ and SDF.

Upon the next running of program 304, step 320 will find timer flag TF3 is set, indicating timer T3 is active, and step 320 branches to step 378 which updates timer T3. Step 380 determines if timer T3 has reached a predetermined value, such as 1 hour. If it has not, then step 380 proceeds to step 322. If engine 30 has operated for 1 hour, it indicates that no high engine temperature shut down has occurred during this modified run of engine 30, and step 382 resets the count of COUNTX to 0, and timer flag TF3 is also reset.

Should a high engine temperature shutdown occur before timer T3 expires, timer T3 is deactivated in step 362, and count COUNTX is incremented. Step 364 will now find COUNTX is 2, and step 370 sets the mandatory shut down flag MSDF, to prevent any further automatic restarts of engine 30.

We claim:

1. A method of operating a refrigeration unit, comprising the steps of:

monitoring a predetermined parameter of the refrigeration unit, a predetermined value of which indicates a mandatory shut down condition, shutting the refrigeration unit down in the event the monitored parameter reaches the mandatory shut down condition, incrementing a shut down count when the refrigeration unit is shut down due to the mandatory shut down condition, detecting when the predetermined monitored parameter has a value which permits re-starting of the refrigeration unit, determining the value of the shut down count, restarting the refrigeration unit in response to the detecting step finding that restarting is permitted and the value of the shut down count is less than a predetermined value, modifying the operation of the refrigeration unit when restarted, with the modification being selected to reduce the probability of the monitored parameter reaching the predetermined shut down condition, timing the operation of the refrigeration unit when started by the restarting step, and resetting the shut down count when the refrigeration unit operates for a predetermined period of time without a mandatory shut down.

2. The method of claim 1 including the step of removing the modification of the refrigeration unit initiated by the modifying step, when the refrigeration unit operates for the predetermined period of time without a mandatory shut down.

3. The method of claim 1 including the step of modifying the operation of the refrigeration unit prior to the step of shutting the refrigeration unit down, in an attempt to find an operating condition which will prevent mandatory shut down of the refrigeration unit, in response to the monitoring step finding that the mandatory shut down condition is being approached.

4. A method of operating a refrigeration unit having high and low pressure sides, a refrigerant compressor connected between the high and low pressure sides, and pressure sensor means which monitors the high pressure side, comprising the steps of:

monitoring the high pressure side of the refrigeration unit, shutting the refrigeration unit down when the monitoring step detects a first predetermined pressure which indicates an over-pressure condition, incrementing a shut down count when the refrigeration unit is shut down in response to the over-pressure condition, continuing the step of monitoring the high pressure side of the refrigeration unit during shut down, determining the value of the shut down count, restarting the refrigeration unit as a function of pressure of the high pressure side and the shut down count value, restarting the refrigeration unit only after the pressure monitoring step finds the pressure of the high pressure side has dropped below the first predetermined value to a second predetermined value, and then only when the determining step finds the value of the shut down count is less than a predetermined value, modifying the operation of the refrigeration unit to reduce the load on the compressor when the refrigeration unit is started by the restarting step, timing the operation of the refrigeration unit when started by the restarting step, and resetting the shut down count when the refrigeration unit operates for a predetermined period of time without being shut down again by the step of shutting the refrigeration unit in response to an over-pressure condition.

5. The method of claim 4 wherein the step of modifying the operation of the refrigeration unit to reduce the load on the compressor is responsive to the value of the shut down count, reducing the load on the compressor by a first modification in response to a first predetermined shut down count value, and reducing the load on the compressor still further by a second modification in response to a second predetermined shut down count value which exceeds the first predetermined shut down count value.

6. The method of claim 5 wherein the first and second predetermined shut down count values are one and two, respectively, and the predetermined shut down count value which will prevent the step of restarting the refrigeration unit as a function of pressure and the shut down count value, is three.

7. The method of claim 4 including the step of providing a predetermined minimum time delay between the step of shutting the refrigeration unit down in response to an over-pressure condition and the step of restarting the refrigeration unit.

8. The method of claim 4 wherein the refrigeration unit includes a condenser and a condenser fan having first and second selectable speeds, and including the steps of:

monitoring the temperature of the condenser, and forcing the condenser fan to operate at the higher of the first and second speeds when the refrigeration unit is started by the restarting step and the temperature of the condenser exceeds a predetermined value.

9. The method of claim 8 including the step of discontinuing the condenser fan speed forcing step when the shut down count value is reset.

10. The method of claim 4 wherein the refrigerant compressor is driven by an internal combustion engine at a selected one of first and second speeds, and wherein the step of modifying the operation of the refrigeration unit to reduce the load on the compressor when the refrigeration unit is started by the restarting step includes the step of forcing the internal combustion engine to operate at the lower of the first and second selectable speeds.

11. The method of claim 4 wherein the refrigeration unit includes controllable suction line modulation, and the refrigerant compressor is driven by an internal combustion engine at a selected one of first and second speeds, and wherein the step of modifying the operation of the refrigeration unit to reduce the load on the compressor when the refrigeration unit is started by the restarting step includes the steps of:

forcing the internal combustion engine to operate at the lower of the first and second selectable speeds, and controlling the suction line modulation to increase suction line modulation to a predetermined value.

12. The method of claim 4 wherein the refrigeration unit includes controllable suction line modulation, and the refrigerant compressor is driven by an internal combustion engine at a selected one of first and second speeds, and wherein the step of modifying the operation of the refrigeration unit to reduce the load on the compressor when the refrigeration unit is started by the restarting step is responsive to the value of the shut down count, including the steps of:

reducing the load on the compressor in response to a first predetermined shut down count value by forcing the internal combustion engine to operate at the lower of the first and second selectable speeds, and reducing the load on the compressor still further in response to a second predetermined shut down count value by controlling the suction line modulation to increase suction line modulation to a predetermined value, while retaining the step of forcing the internal combustion engine to operate at the lower of the first and second selectable speeds.

13. A method of operating a refrigeration unit having a refrigerant compressor driven by an internal combustion engine having a temperature sensor, comprising the steps of:

monitoring the temperature of the internal combustion engine, initiating a first predetermined modification of the refrigeration unit which reduces the load on the internal combustion engine when the monitoring step detects a first predetermined over-temperature condition, shutting the internal combustion engine down when the monitoring step detects a predetermined maximum over-temperature condition, incrementing a shut down count when the internal combustion engine is shut down in response to the maximum over-temperature condition, determining the value of the shut down count, restarting the internal combustion engine as a function of the temperature of the internal combustion engine and the value of the shut down count, restarting the internal combustion engine only when the monitoring step detects the temperature of the internal combustion engine has dropped to a predetermined value, and then only when the determining step finds the shut down count value is below a predetermined count value, timing the operating time of the internal combustion engine when started by the restarting step, and resetting the shut down count when the internal combustion engine operates for a predetermined period of time without being shut down again in response to the predetermined maximum over-temperature condition.

14. The method of claim 13 wherein the internal combustion engine is liquid cooled, and including coolant level detector means for detecting a predetermined low coolant condition, and wherein the step of restarting the internal combustion engine is additionally a function of the coolant level detector means, enabling the step of restarting the internal combustion engine only when the predetermined low coolant condition has not been detected by the coolant level detector means.

15. The method of claim 13 wherein the refrigeration unit includes a condenser and a condenser fan operable in a selectable one of first and second operating speeds, and wherein the step of initiating a first predetermined modification of the refrigeration unit which reduces the load on the internal combustion engine when the monitoring step detects a first predetermined over-temperature condition includes the step forcing the condenser fan to operate in the higher of the first and second operating speeds.

16. The method of claim 15 wherein the internal combustion engine is operable at a selectable one of first and second operating speeds, and including the step of:

initiating a second predetermined modification of the refrigeration unit which additionally reduces the load on the internal combustion engine when the monitoring step detects a second predetermined over-temperature condition, said step of initiating a second predetermined modification including the step of forcing the internal combustion engine to operate at the lower of the first and second operating speeds.

17. The method of claim 16 wherein the refrigeration unit includes controllable suction line modulation means, and including the steps of:

providing a predetermined time delay after the step of forcing the low speed operation of the internal combustion engine, and wherein the step of initiating the second predetermined modification further includes the step of initiating a first predetermined percentage of suction line modulation when the second over-temperature persists after the predetermined time delay.

18. The method of claim 17 including the step of initiating a third predetermined modification of the refrigeration unit which additionally reduces the load on the internal combustion engine when the monitoring step detects a third predetermined over-temperature condition, said step of initiating a third predetermined modification including the step of increasing the suction line modulation to a second predetermined percentage.

19. A refrigeration unit, comprising:

monitor means for monitoring a predetermined parameter of the refrigeration unit, a predetermined value of which indicates a mandatory shut down condition, means for shutting the refrigeration unit down in the event the monitor means indicates that the monitored parameter has reached the mandatory shut down condition, shut down counting means, means for incrementing the shut down counting means in response to the refrigeration unit being shut down by the mandatory shut down condition, said monitor means detecting when the predetermined monitored parameter has a value which permits restarting of the refrigeration unit, means for restarting the refrigeration unit in response to the monitor means finding that restarting of the refrigeration unit is permitted and the value of the shut down counting means is less than a predetermined value, means for modifying the operation of the refrigeration unit when restarted, with the modification being selected to reduce the probability of the monitored parameter from reaching the predetermined shut down condition, timing means for timing the operation of the refrigeration unit when started by the restarting step, and means for resetting the shut down counting means when the refrigeration unit operates for a predetermined period of time without a mandatory shut down.

20. The refrigeration unit of claim 19 including means for removing the modification of the refrigeration unit initiated by the means for modifying the operation of the refrigeration unit, when the refrigeration unit operates for the predetermined period of time without a mandatory shut down.

21. The refrigeration unit of claim 19 including means for modifying the operation of the refrigeration unit in an attempt to find an operating condition which will prevent mandatory shut down of the refrigeration unit, in response to the monitor means finding that the mandatory shut down condition is being approached.

22. A refrigeration unit having high and low pressure sides, a refrigerant compressor connected between the high and low pressure sides, and pressure sensor means disposed to sense the pressure of the high pressure side, with the pressure sensor means initiating shut down of the refrigeration unit down in response to detection of a predetermined over-pressure condition, comprising:

shut down counting means, means incrementing the shut down counting means when the refrigeration unit is shut down in response to the predetermined over pressure condition, means restarting the refrigeration unit in response to the pressure sensor means and the shut down counting means, restarting the refrigeration unit only when the pressure sensor means finds the pressure of the high side has dropped below the first predetermined value to a second predetermined value, and then only when the value of the shut down counting means is less than a predetermined value, means modifying the operation of the refrigeration unit to reduce the load on the compressor when the refrigeration unit is started by the restarting means, timing means timing the operation of the refrigeration unit when started by the restarting means, and means resetting the shut down count when the refrigeration unit operates for a predetermined period of time without being shut down again in response to an over-pressure condition.

23. The refrigeration unit of claim 22 wherein the means modifying the operation of the refrigeration unit to reduce the load on the compressor is responsive to the value of the shut down counting means, reducing the load on the compressor by a first modification in response to a first predetermined shut down count value, and reducing the load on the compressor still further by a second modification in response to a second predetermined shut down count value which exceeds the first shut down value.

24. The refrigeration unit of claim 23 wherein the first and second predetermined shut down count values are one and two, respectively, and the predetermined shut down count value of the shut down counting means which will prevent the re-starting means from re-starting the refrigeration unit as a function of pressure and the shut down count value, is three.

25. The refrigeration unit of claim 22 including means providing a predetermined minimum time delay between shut down of the refrigeration unit in response to an over-pressure condition and a restart of the refrigeration unit.

26. The refrigeration unit of claim 22 including a condenser, and a condenser fan having first and second selectable speeds, and including:

means monitoring the temperature of the condenser, and means forcing the condenser fan to operate at the higher of the first and second speeds when the refrigeration unit is started by the restarting means and the temperature of the condenser exceeds a predetermined value.

27. The refrigeration unit of claim 26 wherein the means forcing the condenser fan to operate at the higher of the first and second speeds discontinues the high speed forcing when the shut down count value of the shut down counting means is reset.

28. The refrigeration unit of claim 22 wherein the refrigerant compressor is driven by an internal combustion engine at a selected one of first and second speeds, and wherein the means modifying the operation of the refrigeration unit to reduce the load on the compressor when the refrigeration unit is started by the restarting step includes means forcing the internal combustion engine to operate at the lower of the first and second selectable speeds.

29. The refrigeration unit of claim 22 including:

controllable suction line modulation valve means, and an internal combustion engine connected to drive the refrigerant compressor at a selected one of first and second speeds, and wherein the means modifying the operation of the refrigeration unit to reduce the load on the compressor when the refrigeration unit is started by the restarting means includes means forcing the internal combustion engine to operate at the lower of the first and second selectable speeds, and means controlling the suction line modulation valve to increase suction line modulation to a predetermined value.

30. The refrigeration unit of claim 22 including:

controllable suction line modulation valve means, and an internal combustion engine connected to drive the refrigerant compressor at a selected one of first and second speeds, and wherein the means modifying the operation of the refrigeration unit to reduce the load on the compressor when the refrigeration unit is started by the restarting means is responsive to the value of the shut down counting means, including means forcing the internal combustion engine to operate at the lower of the first and second selectable speeds in response to a first predetermined shut down count value, and means controlling the suction line modulation valve to increase suction line modulation to a predetermined value, while the internal combustion engine is forced to operate at the lower of the first and second selectable speeds, in response to a second predetermined shut down count value which exceeds the first predetermined shut down value.

31. A refrigeration unit having a refrigerant compressor driven by an internal combustion engine, and temperature sensor means for sensing the temperature of the internal combustion engine, comprising:

means initiating a first predetermined modification of the refrigeration unit which reduces the load on the internal combustion engine when the temperature sensor means detects a first predetermined over-temperature condition, shut down means for shutting the internal combustion engine down when the temperature sensor means detects a predetermined maximum over-temperature condition, shut down counting means, means incrementing said shut down counting means when the internal combustion engine is shut down in response to the maximum over-temperature condition, means for restarting the internal combustion engine as a function of the temperature of the internal combustion engine and the value of the shut down counting means, with said restart means restarting the internal combustion engine only when the temperature of the internal combustion engine has dropped to a predetermined value, and the value of the shut down counting means is below a predetermined count value, timing means for timing the operating time of the internal combustion engine when started by the restarting means, and means resetting the shut down counting means when the internal combustion engine has operated for a predetermined period of time without being shut down again by the shut down means.

32. The refrigeration unit of claim 31 wherein the internal combustion engine is liquid cooled, and including coolant level detector means for detecting a predetermined low coolant condition, and wherein the means for restarting the internal combustion engine is additionally a function of the coolant level detector means, enabling the restart means only when the predetermined low coolant condition has not been detected by the coolant level detector means.

33. The refrigeration unit of claim 31 wherein the refrigeration unit includes a condenser and a condenser fan operable in a selectable one of first and second operating speeds, and wherein the means for initiating a first predetermined modification of the refrigeration unit which reduces the load on the internal combustion engine when the monitoring step detects a first predetermined over-temperature condition includes means for forcing the condenser fan to operate in the higher of the first and second operating speeds.

34. The refrigeration unit of claim 33 wherein the internal combustion engine is operable at a selectable one of first and second operating speeds, and including:

means for initiating a second predetermined modification of the refrigeration unit which additionally reduces the load on the internal combustion engine when the temperature sensor detects a second predetermined over-temperature condition, said means for initiating a second predetermined modification of the refrigeration unit including the means forcing the internal combustion engine to operate at the lower of the first and second operating speeds.

35. The refrigeration unit of claim 34 including:

controllable suction line modulation means, means providing a predetermined time delay after the forcing means forces the low speed operation of the internal combustion engine, and wherein the means for initiating the second predetermined modification further includes means for selecting a first predetermined percentage of suction line modulation when the second over-temperature persists after the predetermined time delay.

36. The method of claim 35 including means for initiating a third predetermined modification of the refrigeration unit which additionally reduces the load on the internal combustion engine when the temperature sensor detects a third predetermined over-temperature condition, said means for initiating a third predetermined modification including means for increasing the suction line modulation to a second predetermined percentage.

* * * * *